United States Patent
Ishii et al.

(10) Patent No.: US 8,165,529 B2
(45) Date of Patent: Apr. 24, 2012

(54) MOBILE STATION, RADIO BASE STATION, MOBILE COMMUNICATION SYSTEM, AND METHOD OF TRANSMITTING AND RECEIVING BROADCAST INFORMATION

(75) Inventors: Minami Ishii, Yokohama (JP); Sadayuki Abeta, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 281 days.

(21) Appl. No.: 12/442,917

(22) PCT Filed: Oct. 2, 2007

(86) PCT No.: PCT/JP2007/069298
§ 371 (c)(1),
(2), (4) Date: May 14, 2009

(87) PCT Pub. No.: WO2008/044551
PCT Pub. Date: Apr. 17, 2008

(65) Prior Publication Data
US 2010/0069076 A1    Mar. 18, 2010

(30) Foreign Application Priority Data
Oct. 3, 2006 (JP) .................................. 2006-272341

(51) Int. Cl.
*G06F 15/173* (2006.01)
*H04W 72/04* (2009.01)

(52) U.S. Cl. ...................... 455/67.11; 455/434; 455/560; 370/328; 370/329; 370/342; 375/211; 375/260; 709/226

(58) Field of Classification Search ............... 455/67.11, 455/434, 450, 560; 370/328, 329, 335, 342; 375/211, 260; 701/33
See application file for complete search history.

(56) References Cited

U.S. PATENT DOCUMENTS

| | | | |
|---|---|---|---|
| 2005/0066034 A1* | 3/2005 | Beckmann et al. | 709/226 |
| 2007/0049344 A1* | 3/2007 | Van Der Velde et al. | 455/560 |
| 2008/0130612 A1* | 6/2008 | Gorokhov et al. | 370/342 |
| 2008/0181181 A1* | 7/2008 | Gorokhov et al. | 370/335 |
| 2009/0110038 A1* | 4/2009 | Montojo et al. | 375/211 |
| 2009/0170442 A1* | 7/2009 | Asanuma et al. | 455/67.11 |
| 2009/0219860 A1* | 9/2009 | Tanno et al. | 370/328 |
| 2010/0091892 A1* | 4/2010 | Gorokhov | 375/260 |
| 2010/0091893 A1* | 4/2010 | Gorokhov | 375/260 |
| 2010/0105380 A1* | 4/2010 | Attar et al. | 455/434 |

(Continued)

FOREIGN PATENT DOCUMENTS

EP    1283652 A1    2/2003

(Continued)

OTHER PUBLICATIONS

3GPP TS 25.331 V6.10.0; Jun. 2006, "Radio Resource Control (RCC)," 1226 pages.

(Continued)

*Primary Examiner* — William D Cumming
(74) *Attorney, Agent, or Firm* — Osha • Liang LLP

(57) ABSTRACT

A radio base station for establishing a signaling control channel and a shared data channel for a mobile station and communicating with the mobile station includes a broadcast information generating unit configured to generate broadcast information including one or more information blocks; a scheduling information generating unit configured to generate scheduling information for the one or more information blocks; and a broadcast information transmitting unit configured to transmit the scheduling information as part of the broadcast information.

10 Claims, 6 Drawing Sheets

U.S. PATENT DOCUMENTS

| | | | | |
|---|---|---|---|---|
| 2010/0128805 A1* | 5/2010 | Tanno et al. | ............... | 375/260 |
| 2010/0142475 A1* | 6/2010 | Kim et al. | ............... | 370/329 |
| 2010/0286864 A1* | 11/2010 | Kawauchi et al. | ............... | 701/33 |

FOREIGN PATENT DOCUMENTS

| | | | |
|---|---|---|---|
| JP | 05-091079 A | 4/1993 | |
| JP | 11-239152 A | 8/1999 | |
| JP | 2002-300168 A | 10/2002 | |
| WO | 2005/078965 A1 | 8/2005 | |

OTHER PUBLICATIONS

3GPP TS 25.212 V6.5.0, Jun. 2005, "Multiplexing and Channel Coding (FDD)," 81 pgs.

3GPP TR 25.813 V7.0.0, Jun. 2006, "Evolved Universal Terrestrial Radio Access (E-UTRA) and Evolved Universal Terrestrial Radio Access Network (E-UTRAN)," 39 pgs.

International Search Report issued in PCT/JP2007/069298, mailed on Jan. 29, 2008, with translation, 3 pages.

Written Opinion issued in PCT/JP2007/069298, mailed on Jan. 29, 2008, 3 pages.

3GPP TS 25.331 V6.5.0; Mar. 2005, "Radio Resource Control (RCC)," Protocol Specification (Release 6); 3 pages.

Japanese Office Action for Application No. 2008-538665, mailed on Mar. 9, 2010 (5 pages).

Japanese Office Action for Japanese Application No. 2008-538665, mailed on Jun. 8, 2010 (5 pages).

3GPP TSG RAN WG2 meeting #53; ITRI, BCH load reduction by sharing with DL-SCH, R2-061247, May 12, 2006 (3 pages).

Extended European Search Report for Application No. 07829038.4, mailed on Aug. 17, 2011 (8 pages).

esp@cenet Patent Abstract for European Patent No. 1283652, publication date Feb. 12, 2003. (1 page).

\* cited by examiner

FIG.3

| INFORMATION BLOCK TYPE | TRANSMISSION TIMING | TRANSMISSION PERIOD | TRANSMISSION POSITION | TRANSMISSION BLOCK SIZE | THE NUMBER OF ALLOCATED RADIO RESOURCES |
|---|---|---|---|---|---|
| A | A1 | A2 | A3 | A4 | A5 |
| B | B1 | B2 | B3 | B4 | B5 |
| C | C1 | C2 | C3 | C4 | C5 |

FIG.5

|  | GENERAL DESCRIPTION |
|---|---|
| information block type | the information block type of broadcast information |
| modified information identifier | the identifier indicating whether information included in the information block is modified |
| radio resource allocation information | the number of allocated radio resources |
| information block size | the size of the information block |
| information block position | the transmission position of the information block |
| transmission period | the repetition period of the information block |
| division number | the number of divided information blocks |
| divided portion transmission period | the transmission period of divided portions in the case of the information block is divided into portions |

MOBILE STATION, RADIO BASE STATION, MOBILE COMMUNICATION SYSTEM, AND METHOD OF TRANSMITTING AND RECEIVING BROADCAST INFORMATION

TECHNICAL FIELD

The present invention relates to a mobile station, a radio base station, a mobile communication system, and a method of transmitting and receiving broadcast information.

BACKGROUND ART

In mobile communication systems, information used upon establishing connection or during communication and information about other systems are broadcast in advance. These kinds of information are referred to as broadcast information (system information).

Broadcast information defined in IMT-2000 (International Mobile Telecommunications 2000) is classified into a master information block (MIB) and system information blocks (SIBs) associated with the MIB.

The master information block includes transmission timing of each system information block and a value tag indicating whether information is modified. The system information blocks are defined according to their properties. For example, information about the configuration of a common channel and information about regulations are defined in different system information blocks (see TS25.331 V6.10.0 8.1.1).

When broadcast information is transmitted on a shared channel, the master information block and the system information blocks are transmitted on a shared data channel. On the other hand, the size of each system information block and information about resource allocation are transmitted on a signaling control channel or signaling control channels. It should be noted that one or more signaling control channels may be defined within a cell. The number of signaling control channels corresponds to the number of users capable of transmitting data at the same time (see TS25.212 V6.5.0 4.6).

DISCLOSURE OF INVENTION

Problem(s) to be Solved by the Invention

However, the above-mentioned related art presents the following problems.

When broadcast information is transmitted on the shared data channel, a mobile station situated at the cell edge has to receive the broadcast information. In this case, higher transmission power for the signaling control channel is needed to transmit the broadcast information, which limits the number of available signaling control channels. Consequently, the number of users capable of transmitting data while broadcast information is transmitted is limited, which causes a problem in that all the frequency bands in the cell cannot be used and transmission efficiency may be reduced.

Furthermore, the mobile station has to always receive the signaling control channel to determine whether broadcast information is to be transmitted, unless the mobile station knows the time when the broadcast information is to be transmitted. Consequently, the mobile station has to always activate the receiver, which causes a problem in that the battery in the mobile station is drained.

In view of the above-mentioned problems, it is a general object of the present invention to eliminate the need for the signaling control channel and alleviate the limit on the number of signaling control channels or the number of users whose data are multiplexed to improve transmission efficiency or to reduce battery drain in the mobile station, by transmitting, as part of scheduling information included in broadcast information, information to be originally transmitted on the signaling control channel.

Means for Solving the Problem(s)

In one aspect of the present invention, there is provided a radio base station for establishing a signaling control channel and a shared data channel for a mobile station and communicating with the mobile station, including:

a broadcast information generating unit configured to generate broadcast information including one or more information blocks;

a scheduling information generating unit configured to generate scheduling information for the one or more information blocks; and a broadcast information transmitting unit configured to transmit the scheduling information as part of the broadcast information.

In another aspect of the present invention, there is provided a mobile station for establishing a signaling control channel and a shared data channel with a radio base station and communicating with the radio base station, including:

a broadcast information receiving unit configured to receive broadcast information from the radio base station; and a scheduling information storage unit configured to extract scheduling information for each information block from the received broadcast information to store the scheduling information.

In another aspect of the present invention, there is provided a mobile communication system for establishing a signaling control channel and a shared data channel between a mobile station and a radio base station for communications, wherein the radio base station includes:

a broadcast information generating unit configured to generate broadcast information including one or more information blocks;

a scheduling information generating unit configured to generate scheduling information for the one or more information blocks; and a broadcast information transmitting unit configured to transmit the scheduling information as part of the broadcast information; and the mobile station includes:

a broadcast information receiving unit configured to receive the broadcast information from the radio base station; and a scheduling information storage unit configured to extract the scheduling information for each of the information blocks from the received broadcast information to store the scheduling information.

In another aspect of the present invention, there is provided a method of transmitting and receiving broadcast information in a mobile communication system for establishing a signaling control channel and a shared data channel between a mobile station and a radio base station for communications, including the steps of:

by the radio base station, generating the broadcast information including one or more information blocks;

generating scheduling information for the one or more information blocks; and transmitting the scheduling information as part of the broadcast information; and by the mobile station, receiving the broadcast information; and extracting the scheduling information for each of the information blocks from the received broadcast information and storing the scheduling information.

Advantageous Effect of the Invention

According to an embodiment of the present invention, it is possible to eliminate the need for the signaling control channel and alleviate the limit on the number of users whose data are multiplexed, since information to be originally transmitted on the signaling control channel is transmitted as part of scheduling information included in broadcast information. In addition, the mobile station need only activate the receiver at the scheduled timing, thus reducing battery drain, since the mobile station knows the scheduling information in advance.

BRIEF DESCRIPTION OF THE DRAWINGS

FIG. 3 shows a broadcast information scheduling information table in accordance with one embodiment of the present invention.

FIG. 5 shows broadcast information scheduling information in accordance with one embodiment of the present invention.

DETAILED DESCRIPTION OF THE PREFERRED EMBODIMENTS

Figure 1:
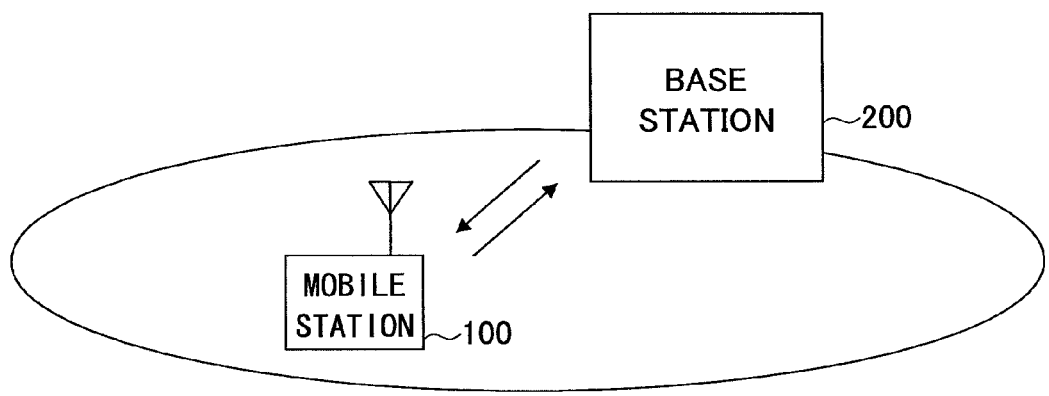
FIG. 1 shows a mobile communication system in accordance with one embodiment of the present invention.

Description of Notations 100 mobile station
200 radio base station
102 broadcast information receiving unit
104 scheduling information storage unit
202 broadcast information generating unit
204 scheduling information generating unit
206 broadcast information transmitting unit

BEST MODE OF CARRYING OUT THE INVENTION

With reference to the accompanying drawings, a description is given below with regard to preferred embodiments of the present invention. Throughout the drawings for illustrating the embodiments, corresponding elements are referenced by the same reference numerals, and the repetitive descriptions are omitted.

With reference to FIG. 1, a mobile communication system in accordance with one embodiment of the present invention is described below.

The mobile communication system includes a mobile station 100 and a radio base station 200.

The mobile station 100 and the radio base station 200 establish a signaling control channel and a shared data channel and communicate with each other via these channels. These channels can be configured according to 3GPP (The 3rd Generation Partnership Project) specifications (for example, "6.1.1 Physical Channels" in 3GPP TS 36.211 (v8.0.0) and "5.3 Transport Channels" in 3GPP TS 36.300 (v8.1.0)).

Figure 2:
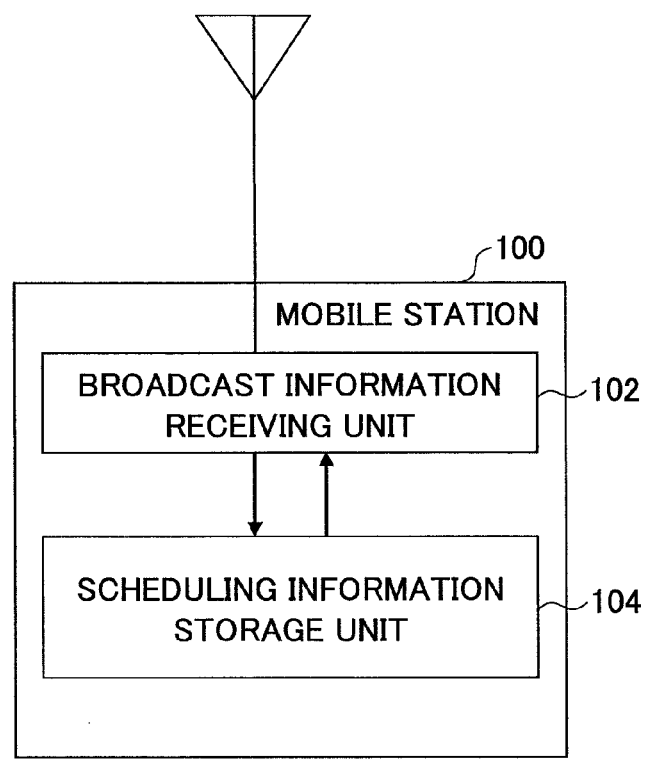
FIG. 2 shows a block diagram of a mobile station in accordance with one embodiment of the present invention.

With reference to FIG. 2, the structure of the mobile station 100 in accordance with the present embodiment is described below.

The mobile station 100 includes a broadcast information receiving unit 102 including an antenna and a scheduling information storage unit 104 connected to the broadcast information receiving unit 102.

The broadcast information receiving unit 102 receives broadcast information. For example, the broadcast information receiving unit 102 receives each information block at the transmission timing of the corresponding information block. It should be noted that the transmission timing of each information block is transmitted as broadcast information and stored in the scheduling information storage unit 104.

The scheduling information storage unit 104 stores scheduling information which defines transmission scheduling of each information block included in broadcast information. For example, the scheduling information of each information block included in broadcast information may be represented by a scheduling information table as shown in FIG. 3.

Figure 4:
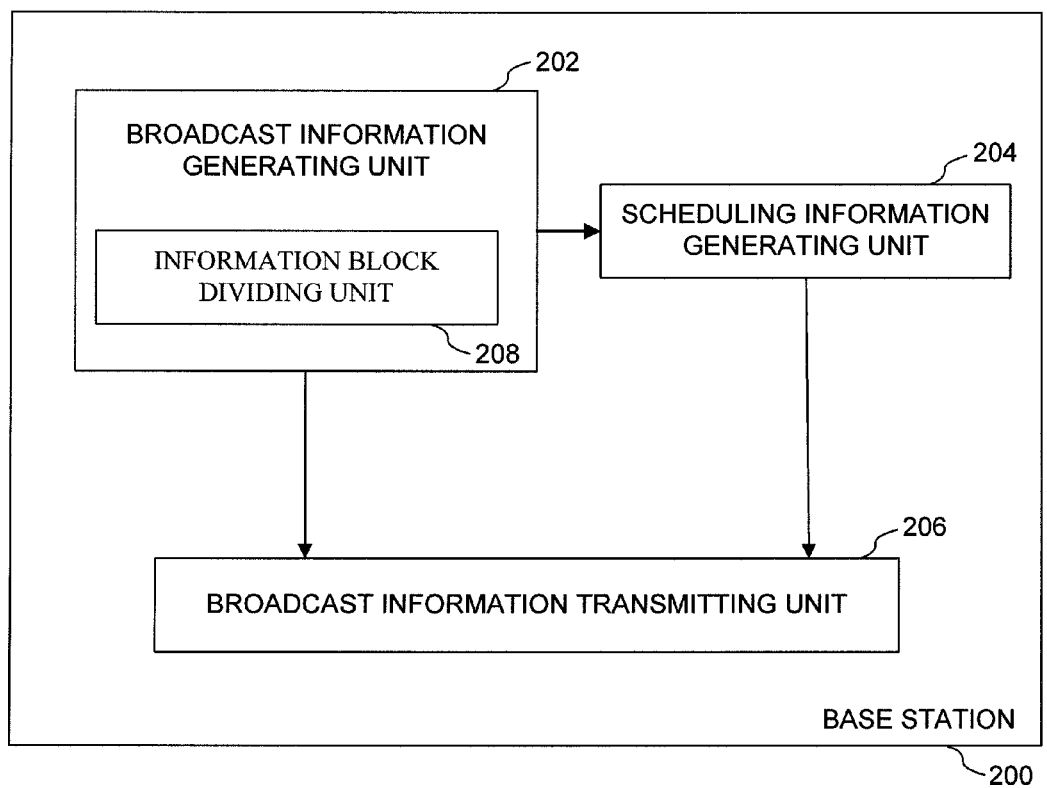
FIG. 4 shows a block diagram of a radio base station in accordance with one embodiment of the present invention.

With reference to FIG. 4, the structure of the radio base station 200 in accordance with the present embodiment is described below.

The base station 200 includes a broadcast information generating unit 202, a scheduling information generating unit 204 connected to the broadcast information generating unit 202, and a broadcast information transmitting unit 206 connected to the broadcast information generating unit 202 and the scheduling information generating unit 204.

The broadcast information generating unit 202 generates broadcast information including one or more information blocks, which is transmitted from the base station 200. The broadcast information generating unit 202 may include an information block dividing unit 208 for dividing the broadcast information into one or more information blocks.

The scheduling information generating unit 204 generates scheduling information for the one or more information blocks generated by the broadcast information generating unit 202. For example, the scheduling information generating unit 204 may generate scheduling information as shown in FIG. 5. Scheduling information such as a coding rate used to receive the broadcast information which is transmitted on the shared data channel may be included in the table shown in FIG. 5 or may be defined in advance as a common parameter for all the information block types.

The broadcast information transmitting unit 206 transmits the broadcast information (including the scheduling information) generated by the broadcast information generating unit 202 and the scheduling information generating unit 204. As mentioned above, it is preferable that the broadcast information be transmitted on the shared data channel, although the broadcast information is originally transmitted on the signaling control channel.

The operation, as a method of transmitting and receiving broadcast information, in the mobile communication system in accordance with the present embodiment is described below.

Figure 6:
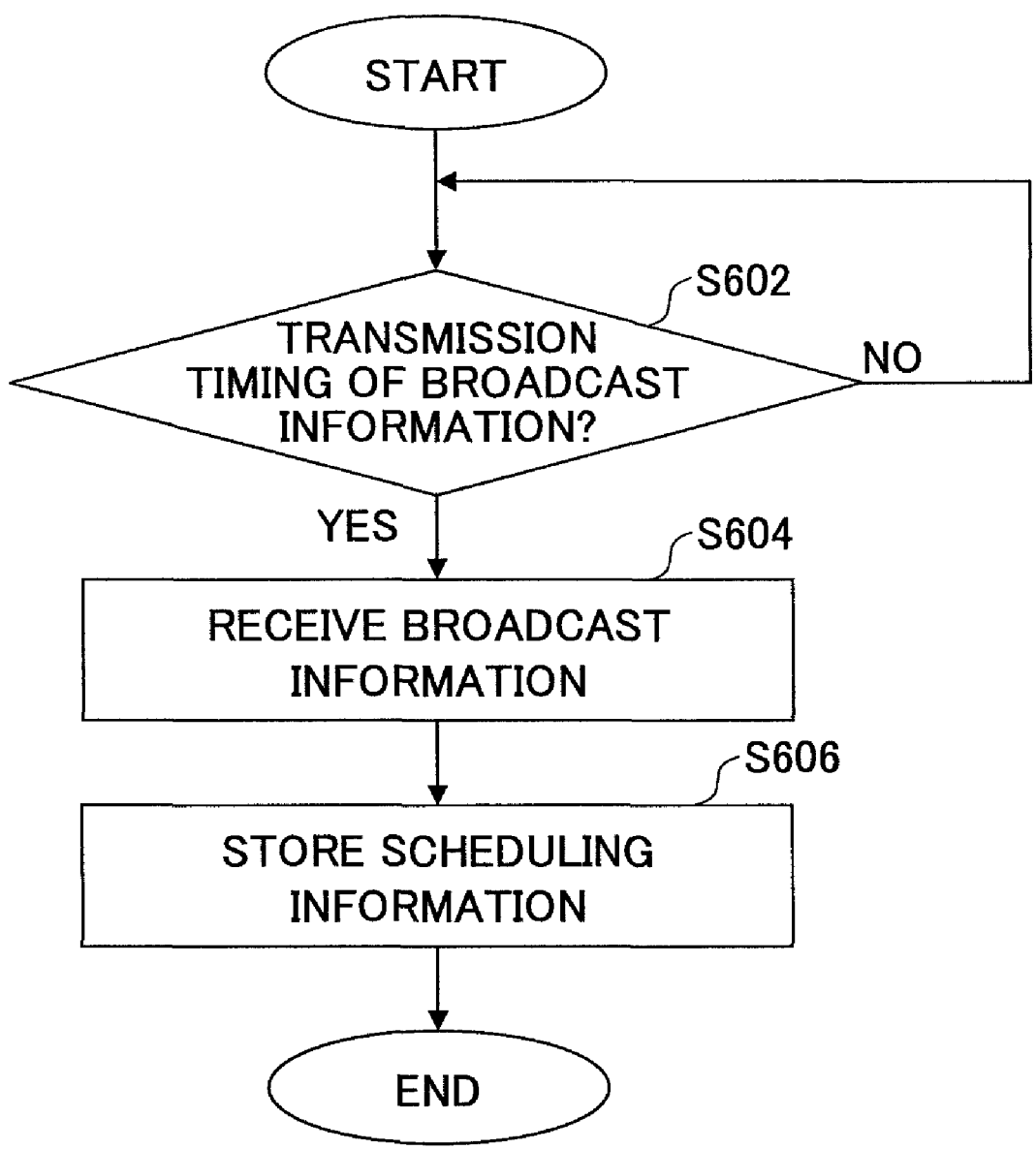
FIG. 6 shows a flowchart of the operation in the mobile station in accordance with one embodiment of the present invention.

With reference to FIG. 6, the operation in the mobile station 100 is described below.

The mobile station 100 receives (S604) broadcast information at the transmission timing of the broadcast information (S602: YES). Except for the transmission timing of the broadcast information (S602: NO), the mobile station 100 waits until the transmission timing of the broadcast information. Specifically, the mobile station 100 waits until the predetermined transmission timing of the broadcast information and receives the broadcast information. The mobile station 100 may stop or deactivate the receiver while the mobile station 100 waits until the transmission timing.

Figure 7:
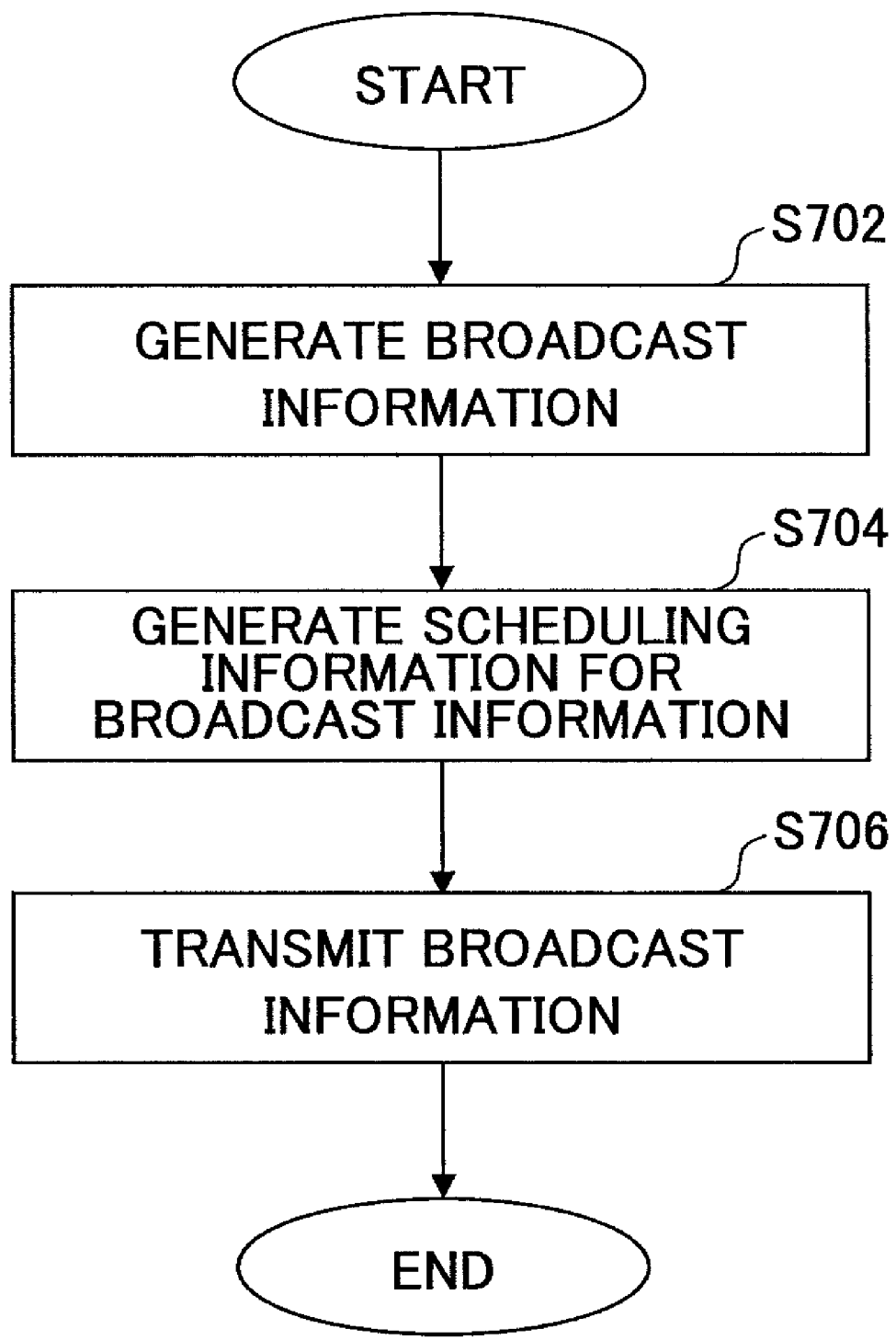
FIG. 7 shows a flowchart of the operation in the radio base station in accordance with one embodiment of the present invention.

With reference to FIG. 7, the operation in the radio base station 200 is described below.

When the radio base station 200 receives broadcast information generated by the broadcast information generating unit 202 (S702), the radio base station 200 generates scheduling information for the broadcast information (S704) and transmits the broadcast information (S706). Specifically, the radio base station 200 performs the steps S702 and S704 shown in FIG. 7 at the time of startup, and then periodically transmits the broadcast information (S706).

According to the radio base station of the present embodiment, it is possible to eliminate the need for the signaling control channel and alleviate the limit on the number of users whose data are multiplexed, since information to be originally transmitted on the signaling control channel is transmitted as part of scheduling information included in broadcast information. In addition, the mobile station need only activate the receiver at the scheduled timing, thus reducing battery drain, since the mobile station knows the scheduling information in advance.

According to the mobile station of the present embodiment, it is possible to eliminate the need for the signaling control channel and alleviate the limit on the number of users whose data are multiplexed, since information to be originally transmitted on the signaling control channel is transmitted as part of scheduling information included in broadcast information. In addition, the mobile station need only activate the receiver at the scheduled timing, thus reducing battery drain, since the mobile station knows the scheduling information in advance.

According to the mobile communication system of the present embodiment, it is possible to eliminate the need for the signaling control channel and alleviate the limit on the number of users whose data are multiplexed, since information to be originally transmitted on the signaling control channel is transmitted as part of scheduling information included in broadcast information. In addition, the mobile station need only activate the receiver at the scheduled timing, thus reducing battery drain, since the mobile station knows the scheduling information in advance.

According to the method of the present embodiment, it is possible to eliminate the need for the signaling control channel and alleviate the limit on the number of users whose data are multiplexed, since information to be originally transmitted on the signaling control channel is transmitted as part of scheduling information included in broadcast information. In addition, the mobile station need only activate the receiver at the scheduled timing, thus reducing battery drain, since the mobile station knows the scheduling information in advance.

This international patent application is based on Japanese Priority Application No. 2006-272341 filed on Oct. 3, 2006, the entire contents of which are incorporated herein by reference.

The invention claimed is:

1. A radio base station for establishing a signaling control channel and a shared data channel for a mobile station and communicating with the mobile station, comprising:
a system information generating unit configured to generate system information including one or more information blocks;
a scheduling information generating unit configured to generate scheduling information for the one or more information blocks;
a system information transmitting unit configured to transmit the scheduling information as part of system information on the shared data channel
and to transmit the information blocks on the shared data channel.

2. The radio base station as claimed in claim 1, further comprising:
an information block dividing unit configured to divide the system information into the one or more information blocks.

3. The radio base station as claimed in claim 2, wherein:
the scheduling information generated by the scheduling information generating unit includes at least one of transmission timing, a size, resource allocation information, and a transmission period of each of the information blocks formed by the information block dividing unit.

4. A mobile station for establishing a signaling control channel and a shared data channel with a radio base station and communicating with the radio base station, comprising:
a system information receiving unit configured to receive system information from the radio base station on the shared data channel;
a scheduling information storage unit configured to extract scheduling information for each information block from the received system information to store the scheduling information
wherein the system information receiving unit receives information blocks transmitted on the shared data channel according to the scheduling information.

5. The mobile station as claimed in claim 4, wherein:
the scheduling information stored in the scheduling information storage unit includes at least one of transmission timing, a size, resource allocation information, and a transmission time period of each information block.

6. A mobile communication system for establishing a signaling control channel and a shared data channel between a mobile station and a radio base station for communications, wherein
the radio base station comprises:
a system information generating unit configured to generate system information including one or more information blocks;
a scheduling information generating unit configured to generate scheduling information for the one or more information blocks; and
a system information transmitting unit configured to transmit the scheduling information as part of system information on the shared data channel
and to transmit the information blocks on the shared data channel; and
the mobile station comprises:
a system information receiving unit configured to receive the system information from the radio base station on the shared data channel;
a scheduling information storage unit configured to extract the scheduling information for each of the information blocks from the received system information to store the scheduling information wherein the system information receiving unit receives the information blocks transmitted on the shared data channel according to the scheduling information.

7. The radio communication system as claimed in claim 6, wherein:
the radio base station further comprises an information block dividing unit configured to divide the system information into the one or more information blocks.

8. A method of transmitting and receiving broadcast information in a mobile communication system for establishing a signaling control channel and a shared data channel between a mobile station and a radio base station for communications, comprising the steps of:
by the radio base station,
generating the system information including one or more information blocks;
generating scheduling information for the one or more information blocks; and
transmitting the scheduling information as part of system information on the shared data channel and transmitting the information blocks on the shared data channel; and
by the mobile station,
receiving the system information on the shared data channel; and
extracting the scheduling information for each of the information blocks from the received system information and storing the scheduling information.

9. The method as claimed in claim 8, further comprising the step of:
dividing, by the radio base station, the system information into the one or more information blocks.

10. The method as claimed in claim 9, wherein:
the scheduling information generated in the step of generating scheduling information includes at least one of transmission timing, a size, resource allocation information, and a transmission period of each of the information blocks, and
the scheduling information stored in the step of storing the scheduling information includes at least one of transmission timing, a size, resource allocation information, and a transmission period of each of the information blocks.

* * * * *